(12) United States Patent
Hiroki et al.

(10) Patent No.: US 10,199,851 B2
(45) Date of Patent: Feb. 5, 2019

(54) POWER SUPPLY BELT CONTAINING FLEXIBLE BATTERY AND POWER GENERATION MEANS FOR SUPPLYING POWER TO PORTABLE ELECTRONIC DEVICES, INCLUDING WEARABLE DEVICES

(71) Applicant: Semiconductor Energy Laboratory Co., LTD., Atsugi-shi, Kanagawa-ken (JP)

(72) Inventors: Masaaki Hiroki, Kanagawa (JP); Junpei Momo, Kanagawa (JP); Hideaki Kuwabara, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 275 days.

(21) Appl. No.: 14/862,307

(22) Filed: Sep. 23, 2015

(65) Prior Publication Data

US 2016/0094079 A1 Mar. 31, 2016

(30) Foreign Application Priority Data

Sep. 26, 2014 (JP) .................. 2014-196132

(51) Int. Cl.
*H02J 7/00* (2006.01)
*H02J 7/02* (2016.01)
(Continued)

(52) U.S. Cl.
CPC ............ *H02J 7/025* (2013.01); *H02J 7/0047* (2013.01); *H02J 7/0054* (2013.01); *H02J 7/34* (2013.01);
(Continued)

(58) Field of Classification Search
CPC ....................................................... H02J 7/025
(Continued)

(56) References Cited

U.S. PATENT DOCUMENTS 3,919,615 A * 11/1975 Niecke .................. H01M 10/46
224/663
8,814,754 B2 8/2014 Weast et al.
(Continued)

FOREIGN PATENT DOCUMENTS

JP 11-086818 A 3/1999
JP 2013-146557 A 8/2013
KR 2015-0070691 * 6/2015

*Primary Examiner* — Richard V Muralidar
(74) *Attorney, Agent, or Firm* — Nixon Peabody LLP; Jeffrey L. Costellia

(57) ABSTRACT

A secondary battery module capable of feeding power to a wearable device in a non-contact manner is provided. A power feeding system for an electronic device is provided. The power feeding system includes a secondary battery module and an electronic device. The secondary battery module includes a flexible secondary battery, a power sending portion for non-contact power transmission, a flexible thermoelectric power generating device, and a belt portion storing the flexible secondary battery and the flexible thermoelectric power generating device. The electronic device includes a power receiving portion for non-contact power transmission and is capable of power transmission from the power sending portion for non-contact power transmission which is included in the secondary battery module to the power receiving portion for non-contact power transmission which is included in the electronic device.

20 Claims, 12 Drawing Sheets

(51) Int. Cl.
*H02J 7/35* (2006.01)
*H02J 7/34* (2006.01)
*H02J 50/10* (2016.01)
*H02J 50/12* (2016.01)
*H02J 13/00* (2006.01)
*H01M 2/10* (2006.01)

(52) U.S. Cl.
CPC ............ *H02J 7/35* (2013.01); *H02J 13/0075* (2013.01); *H02J 50/10* (2016.02); *H02J 50/12* (2016.02); *H01M 2/1022* (2013.01); *H02J 7/0042* (2013.01); *H02J 2007/0096* (2013.01); *Y02E 40/72* (2013.01); *Y04S 10/123* (2013.01)

(58) Field of Classification Search
USPC .................................................. 320/108, 101
See application file for complete search history.

(56) References Cited

U.S. PATENT DOCUMENTS

| | | |
|---|---|---|
| 8,974,349 B2 | 3/2015 | Weast et al. |
| 9,011,292 B2 | 4/2015 | Weast et al. |
| 9,160,183 B2 * | 10/2015 | Paczkowski .......... H02J 7/0045 |
| 9,276,424 B2 * | 3/2016 | Paczkowski .......... H02J 7/0042 |
| 2002/0186180 A1 * | 12/2002 | Duda .................. G02B 27/0172 345/8 |
| 2013/0082648 A1 | 4/2013 | Kamata |
| 2013/0110264 A1 | 5/2013 | Weast et al. |
| 2013/0119776 A1 | 5/2013 | Kamata |
| 2013/0132028 A1 | 5/2013 | Crankson et al. |
| 2013/0197680 A1 | 8/2013 | Cobbett et al. |
| 2014/0180453 A1 | 6/2014 | Weast et al. |
| 2014/0180454 A1 | 6/2014 | Weast et al. |
| 2014/0180455 A1 | 6/2014 | Weast et al. |
| 2014/0180456 A1 | 6/2014 | Weast et al. |
| 2014/0261636 A1 * | 9/2014 | Anderson ............. H02J 7/0042 136/251 |
| 2014/0379106 A1 | 12/2014 | Weast et al. |
| 2015/0022957 A1 * | 1/2015 | Hiroki ................... G04G 17/04 361/679.01 |
| 2015/0138699 A1 | 5/2015 | Yamazaki |
| 2015/0142143 A1 | 5/2015 | Cobbett et al. |
| 2016/0087305 A1 | 3/2016 | Yoneda et al. |

* cited by examiner

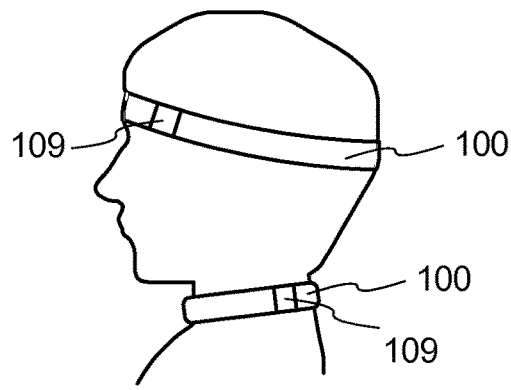
FIG. 5A
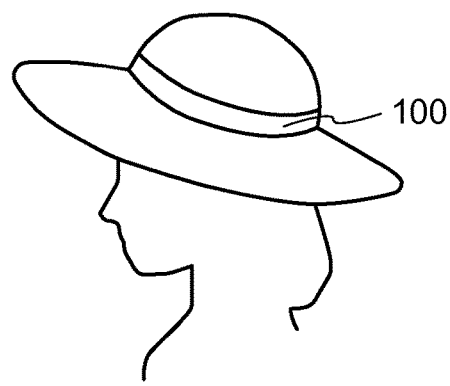
FIG. 5B
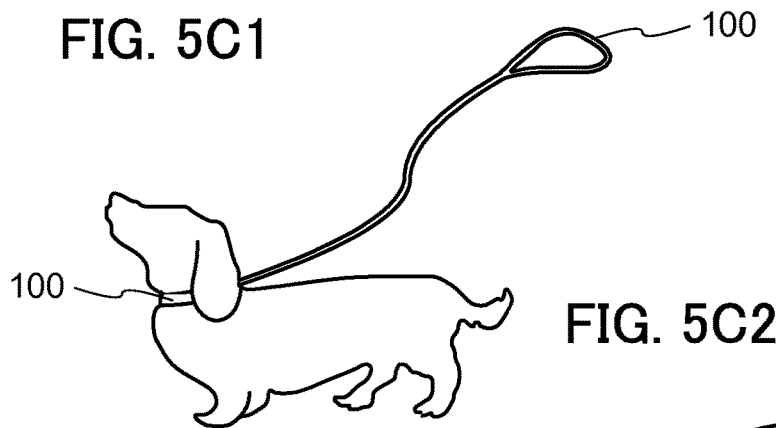
FIG. 5C1
FIG. 5C2

POWER SUPPLY BELT CONTAINING FLEXIBLE BATTERY AND POWER GENERATION MEANS FOR SUPPLYING POWER TO PORTABLE ELECTRONIC DEVICES, INCLUDING WEARABLE DEVICES

BACKGROUND OF THE INVENTION

1. Field of the Invention

The present invention relates to an object, a method, or a manufacturing method. The present invention relates to a process, a machine, manufacture, or a composition of matter. One embodiment of the present invention particularly relates to a semiconductor device, a display device, a light-emitting device, a power storage device, a driving method thereof, and a manufacturing method thereof one embodiment of the present invention particularly relates to a secondary battery, a secondary battery module, and a power feeding system.

2. Description of the Related Art

In recent years, portable information terminals typified by smartphones and tablet terminals and mobile devices such as notebook computers and portable game consoles have been actively developed. Further, wearable devices such as smart glasses and smart watches have also been extensively developed. For example, Patent Document 1 discloses a smart watch capable of monitoring the physical activity of the user. Note that in this specification and the like, portable information terminals, mobile devices, wearable devices, and the like are all included in electronic devices.

Users often carry a plurality of electronic devices, for example, a smartphone, a tablet terminal, and a smart watch.

Most of such electronic devices include secondary batteries, which can be repeatedly charged and discharged. Since portable information terminals and wearable devices are expected to be reduced in weight and size, they have difficulty including high-capacity batteries, which tend to be large and heavy. Accordingly, the duration of use is tended to be limited.

The battery can be replaced as needed with a backup battery that is carried, or can be frequently charged through a cable. However, carrying more electronic devices is troublesome and might impair the merits of portable information terminals or wearable devices.

REFERENCE

Patent Document

[Patent Document 1] Japanese Published Patent Application No. 2013-146557

SUMMARY OF THE INVENTION

In view of the above, an object of one embodiment of the present invention is to provide a secondary battery module having a novel structure and a novel power feeding system. Specifically, an object is to provide a secondary battery module capable of feeding power to an electronic device in a non-contact manner. Another object is to provide a power feeding system for an electronic device.

Another object of one embodiment of the present invention is to provide a novel power storage device, an electronic device including a novel secondary battery module, an electronic device using a novel power feeding system, or the like. Note that the descriptions of these objects do not preclude the existence of other objects. In one embodiment of the present invention, there is no need to achieve all the objects. Other objects will be apparent from and can be derived from the description of the specification, the drawings, the claims, and the like.

One embodiment of the present invention is a secondary battery module comprising a flexible secondary battery, a power sending portion for non-contact power transmission, a flexible thermoelectric power generating device, and a belt portion storing the flexible secondary battery, the power sending portion for non-contact power transmission, and the flexible thermoelectric power generating device. The belt portion comprises a display portion capable of displaying a battery level of the flexible secondary battery.

Another embodiment of the present invention is a power feeding system comprising a secondary battery module and an electronic device, the secondary battery module comprising a flexible secondary battery, a power sending portion for non-contact power transmission, a flexible thermoelectric power generating device, and a belt portion storing the flexible secondary battery, the power sending portion for non-contact power transmission, and the flexible thermoelectric power generating device. The belt portion comprises a display portion capable of displaying a battery level of the flexible secondary battery, and the electronic device comprising a power receiving portion for non-contact power transmission. Power can be transmitted from the power sending portion for non-contact power transmission which is included in the secondary battery module to the power receiving portion for non-contact power transmission which is included in the electronic device.

A secondary battery module having a novel structure and a novel power feeding system can be provided. Specifically, a secondary battery module capable of feeding power to a wearable device in a non-contact manner can be provided. A power feeding system for a wearable device can be provided.

A novel power storage device, an electronic device including a novel secondary battery module, an electronic device using a novel power feeding system, or the like can be provided. Note that the description of these effects does not preclude the existence of other effects. One embodiment of the present invention does not necessarily achieve all the objects listed above. Other effects will be apparent from and can be derived from the description of the specification, the drawings, the claims, and the like.

BRIEF DESCRIPTION OF THE DRAWINGS

In the accompanying drawings:

FIGS. 5A, 5B, 5C1, and 5C2 each illustrate one embodiment of the present invention;

DETAILED DESCRIPTION OF THE INVENTION

Figure 1A:
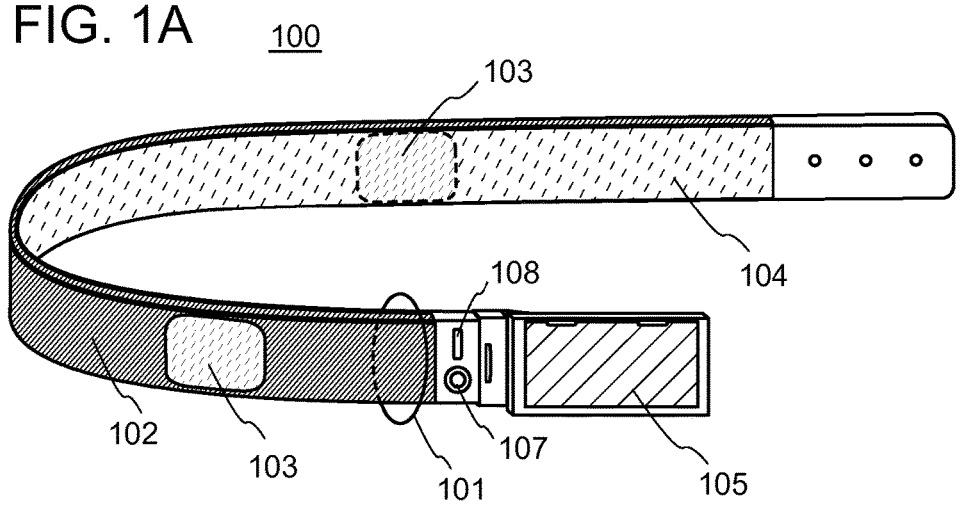
FIGS. 1A to 1E illustrate one embodiment of the present invention.

Embodiments of the present invention will be described below in detail with reference to the drawings. However, the present invention is not limited to the description below, and it is easily understood by those skilled in the art that modes and details disclosed herein can be modified in various ways. Further, the present invention is not construed as being limited to the description of the embodiments below.

The term "electrically connected" includes the case where components are connected through an "object having any electric function". There is no particular limitation on the "object having any electric function" as long as electric signals can be transmitted and received between the components connected through the object.

The position, size, length, range, or the like of each component illustrated in drawings and the like is not accurately represented in some cases for easy understanding. Therefore, the disclosed invention is not necessarily limited to the position, size, length, range, or the like disclosed in the drawings and the like.

The ordinal number such as "first", "second", and "third" are used to avoid confusion among components.

Embodiment 1

In this embodiment, a secondary battery module and a power feeding system according to one embodiment of the present invention are described using FIGS. 1A to 1E, FIGS. 2A to 2D, and FIG. 3.

Figure 1B:
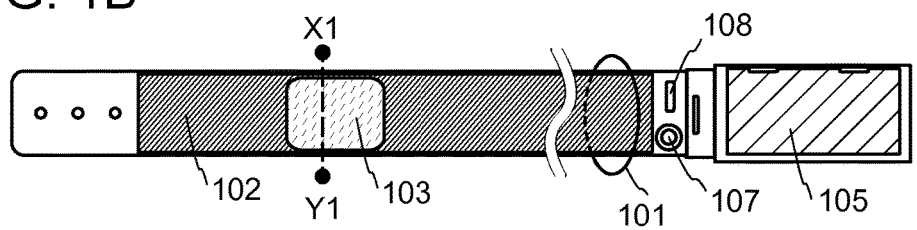
Figure 1C:
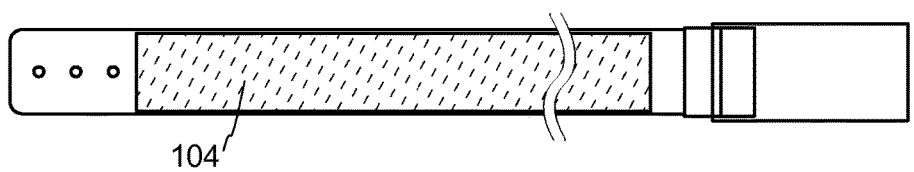
Figure 1D:
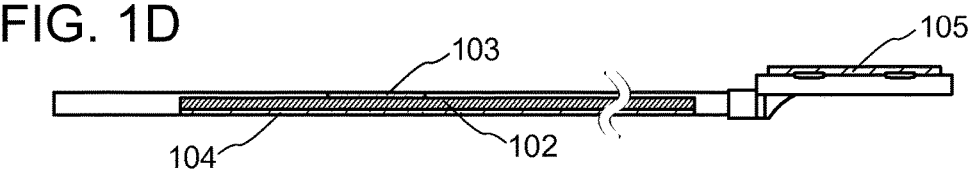
Figure 1E:
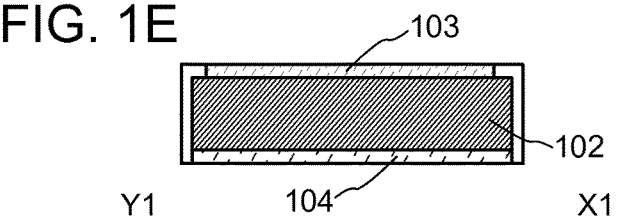

First, a secondary battery module 100 is described. FIG. 1A is a perspective view illustrating the secondary battery module 100 which is curved. FIG. 1B is a front view of the secondary battery module 100. FIG. 1C is a rear view of the secondary battery module 100. FIG. 1D is a top view of the secondary battery module 100. FIG. 1E is a cross-sectional view taken along the line X1-Y1 in FIG. 1B.

The secondary battery module 100 includes a secondary battery 102 and a power transmitting device 103. The secondary battery module 100 preferably includes a power generating device 104. The secondary battery 102, the power transmitting device 103, and the power generating device 104 are stored in a belt portion 101. The belt portion 101 preferably includes a display portion 105. The display portion 105 may include a touch sensor.

Further, the secondary battery module 100 may include a camera 107, a speaker 108, and a motion sensor.

As the secondary battery 102, a flexible secondary battery is used. The flexibility enables the secondary battery 102 to be stored in the belt portion 101, so that the secondary battery module 100 can be worn as a belt and easily carried. As the secondary battery 102, one secondary battery is preferably used. The use of one secondary battery allows the best use of the limited space without the wiring or exterior body that occupies the space, and accordingly the battery capacity of the secondary battery module 100 can be increased.

In this specification and the like, the term "one secondary battery" indicates that the secondary battery is covered with one exterior body. One secondary battery may include a plurality of positive electrode current collectors and a plurality of negative electrode current collectors.

The power transmitting device 103 includes a power sending portion and a power receiving portion for non-contact power transmission. As a method of transmitting electric power, non-contact power transmission is preferably employed. As a method of non-contact power transmission, an electric wave method, an electromagnetic induction method, a resonance method, an electric field coupling method, or the like can be used, and an electric wave method is especially preferred. Since the positions of the power transmission side and the power reception side can be flexibly changed in an electric wave method, the electric wave method is suitably employed for power transmission to wearable devices, which are carried on one's body and constantly change their position.

The power sending portion of the power transmitting device 103 can be used for power transmission to other electronic devices. The power receiving portion of the power transmitting device 103 can be used to charge the secondary battery 102.

As the power generating device 104, a thermoelectric power generating device, a solar cell, a piezoelectric power generating device, or the like can be used. The power generating device 104 preferably has flexibility. In particular, a flexible thermoelectric power generating device is preferably used as the power generating device 104. When the secondary battery module 100 is worn as a belt, the body temperature of the user raises the temperature of the inside of the belt portion 101. Therefore, with the power generating device 104 provided on the inside of the belt portion 101, the difference between the body temperature of the user and the outside air temperature can be utilized to generate power. The electric power generated by the power generating device 104 can be used to charge the secondary battery 102.

Figure 2A:
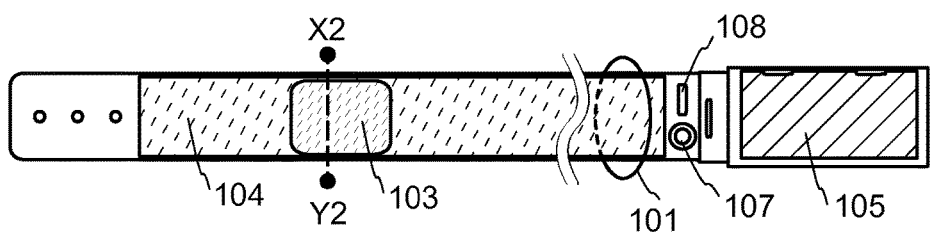
FIGS. 2A to 2D illustrate one embodiment of the present invention.
Figure 2B:
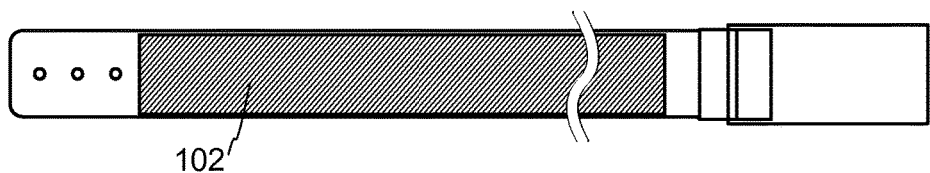
Figure 2C:
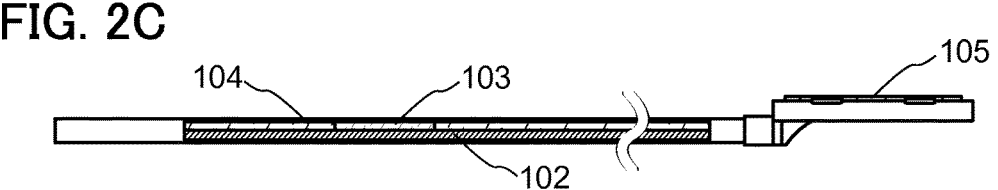
Figure 2D:
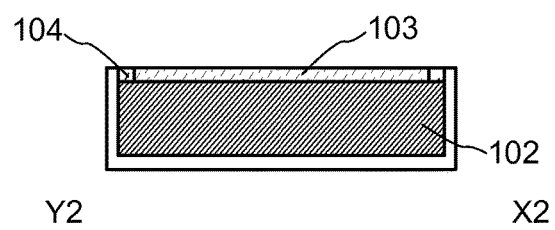

In the case where a solar cell is used as the power generating device 104, the power generating device 104 is preferably provided on the outside of the secondary battery module 100, as illustrated in FIGS. 2A to 2D. FIG. 2A is a front view of the secondary battery module 100 in which the solar cell is used as the power generating device 104, and FIGS. 2B and 2C are a rear view and a top view thereof. FIG. 2D is a cross-sectional view taken along the line X2-Y2 in FIG. 2A.

The belt portion 101 includes a space that can store the secondary battery 102, the power transmitting device 103, and the power generating device 104. As a material of the belt portion 101, a material with enough strength to store the secondary battery 102, the power transmitting device 103, and the power generating device 104 in safety is used, and leather, cloth, resin, or the like can be used. Further, the belt portion 101 preferably includes a buckle portion and a hole for fixing with the buckle portion.

The display portion 105 is provided in the belt portion 101 and can display the battery level of the secondary battery 102, the state of power transmission to other electronic devices, and the like. Further, the display portion 105 is preferably a vari-angle display portion. The variable angle between the display portion 105 and the belt portion 101 enables data displayed on the display portion 105 to be read while the secondary battery module 100 is worn.

Figure 3:
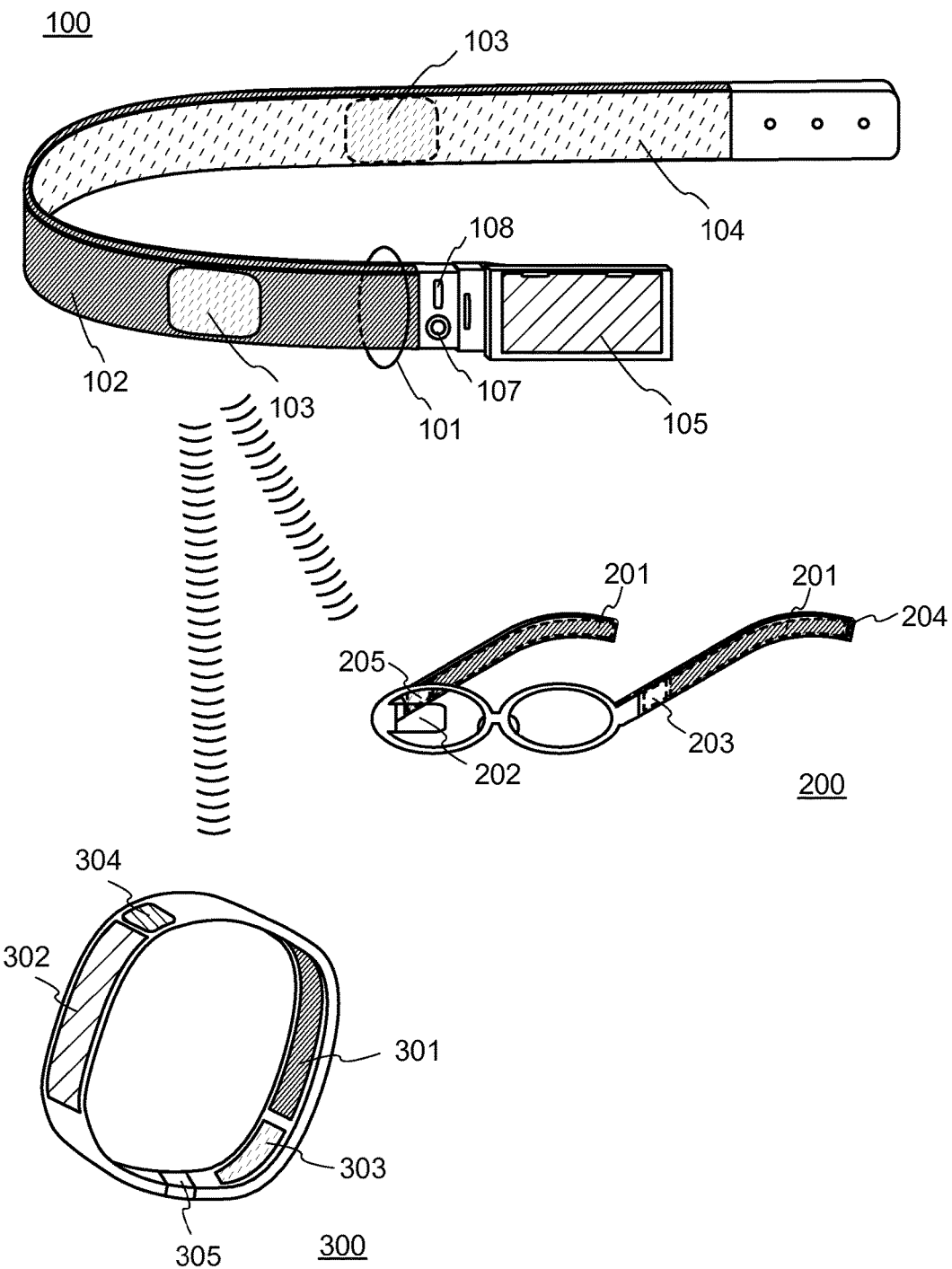
FIG. 3 illustrates one embodiment of the present invention.

Next, the power feeding system is described using FIG. 3. In this embodiment, examples of using a glasses-type device 200 and a wristband-type device 300 as the electronic devices to which electric power is transmitted from the secondary battery module 100 are described.

The glasses-type device 200 includes a secondary battery 201, a control portion 203, a terminal portion 204, and a power transmitting device 205. The glasses-type device 200 preferably includes a display portion 202.

The power transmitting device 205 includes a power receiving portion for non-contact power transmission. Electric power received in the power transmitting device 205 can be used to charge the secondary battery 201. The control portion 203 controls charging and discharging of the secondary battery 201 and data displayed on the display portion 202. Charging of the secondary battery 201 can also be performed through the terminal portion 204 using a cable.

The wristband-type device 300 includes a secondary battery 301, a display portion 302, a power transmitting device 303, an operation button 304, and a connection portion 305.

The power transmitting device 303 includes a power receiving portion for non-contact power transmission. Electric power received in the power transmitting device 303 can be used to charge the secondary battery 301. The connection portion 305, by which ends of the wristband-type device 300 are connected like a ring, has a function of an external connection terminal, and therefore the secondary battery 301 provided in the wristband-type device 300 can also be charged through the connection portion 305.

As described above, electric power can be transmitted in a non-contact manner from the secondary battery module 100 to other electronic devices such as the glasses-type device 200 and the wristband-type device 300.

Many wearable devices such as the glasses-type device 200 and the wristband-type device 300 have difficulty including a high-capacity secondary battery because of the limitations of weight and design. Therefore, electric power from the secondary battery module 100 is transmitted to these electronic devices to increase the operation time of the electronic devices. The electric power can be transmitted to a plurality of electronic devices at the same time, which improves convenience.

In the case of an electronic device that can be charged through a cable as well as by non-contact power transmission, charging can be concentrated on the time when the electronic device is not used.

One embodiment of the present invention can be applied to not only a secondary battery module and a power feeding system but also any of a variety of power storage devices or systems including power storage devices. Examples of the power storage devices are a battery, a primary battery, a secondary battery, a lithium-ion secondary battery, a lithium air battery, a solid-state battery, a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, and the like. Another example of the power storage device is a capacitor. For example, a capacitor such as a lithium ion capacitor may be used as the power storage device of one embodiment of the present invention.

In Embodiment 1, one embodiment of the present invention is described. Other embodiments of the present invention are described in Embodiments 2 to 4. Note that one embodiment of the present invention is not limited thereto. Although the example in which the secondary battery module includes the flexible secondary battery, the power sending portion for non-contact power transmission, and the belt portion storing them is shown as one embodiment of the present invention, one embodiment of the present invention is not limited thereto. The electrolyte in one embodiment of the present invention may contain a substance other than a polymer in some cases or situations. The secondary battery module in one embodiment of the present invention does not necessarily include the flexible secondary battery, the power sending portion for non-contact power transmission, and the belt portion storing them in some cases or situations, for example. Although the example in which the flexible secondary battery is included is shown as one embodiment of the present invention, one embodiment of the present invention is not limited thereto. The power storage device in one embodiment of the present invention may be changed in shape by bending, straightening, or the like as needed, may be kept in some shape, may be prevented from being curved, or may have no flexibility in some cases or situations.

Embodiment 2

In this embodiment, other examples of the secondary battery module and power feeding system according to one embodiment of the present invention are described using FIGS. 4A and 4B and FIGS. 5A to 5C2.

In Embodiment 1, the examples of using the glasses-type device 200 and the wristband-type device 300 as the electronic devices to which electric power is transmitted from the secondary battery module 100 are described. In the power feeding system of one embodiment of the present invention, electric power can be transmitted from the secondary battery module 100 to other electronic devices having any of a variety of shapes or functions.

Figure 4A:
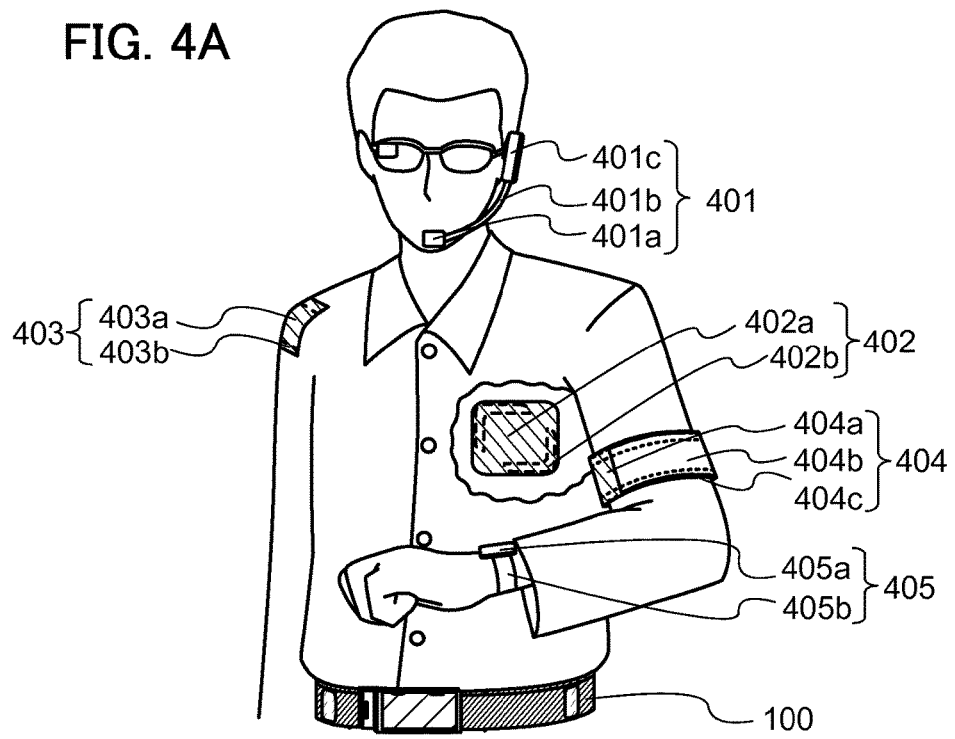
FIGS. 4A and 4B each illustrate one embodiment of the present invention.

For example, as illustrated in FIG. 4A, electric power can be transmitted from the secondary battery module 100 to a headset-type device 401. The headset-type device 401 includes a microphone portion 401a, a flexible pipe 401b, and an earphone portion 401c. The flexible pipe 401b or the earphone portion 401c includes a secondary battery and a power transmitting device. The power transmitting device includes a power receiving portion for non-contact power transmission. Electric power received in the power transmitting device can be used to charge the secondary battery.

Electric power can be transmitted from the secondary battery module 100 to a device 402, which can be directly attached to one's body. In the device 402, a thin housing 402a includes a secondary battery 402b and a power transmitting device. The power transmitting device includes a power receiving portion for non-contact power transmission. Electric power received in the power transmitting device can be used to charge the secondary battery 402b.

Electric power can be transmitted from the secondary battery module 100 to a device 403, which can be attached to clothes. In the device 403, a thin housing 403a includes a secondary battery 403c and a power transmitting device. The power transmitting device includes a power receiving portion for non-contact power transmission. Electric power received in the power transmitting device can be used to charge the secondary battery 403b.

Electric power can be transmitted from the secondary battery module 100 to an armband-type device 404. The armband-type device 404 includes a display portion 404b on a main body 404a, and the main body 404a includes a secondary battery 404c and a power transmitting device. The power transmitting device includes a power receiving portion for non-contact power transmission. Electric power received in the power transmitting device can be used to charge the secondary battery 404c.

Electric power can be transmitted from the secondary battery module 100 to a watch-type device 405. The watch-type device 405 includes a case 405a and a band 405b, and the case 405a includes a secondary battery and a power transmitting device. The power transmitting device includes a power receiving portion for non-contact power transmission. Electric power received in the power transmitting device can be used to charge the secondary battery.

Figure 4B:
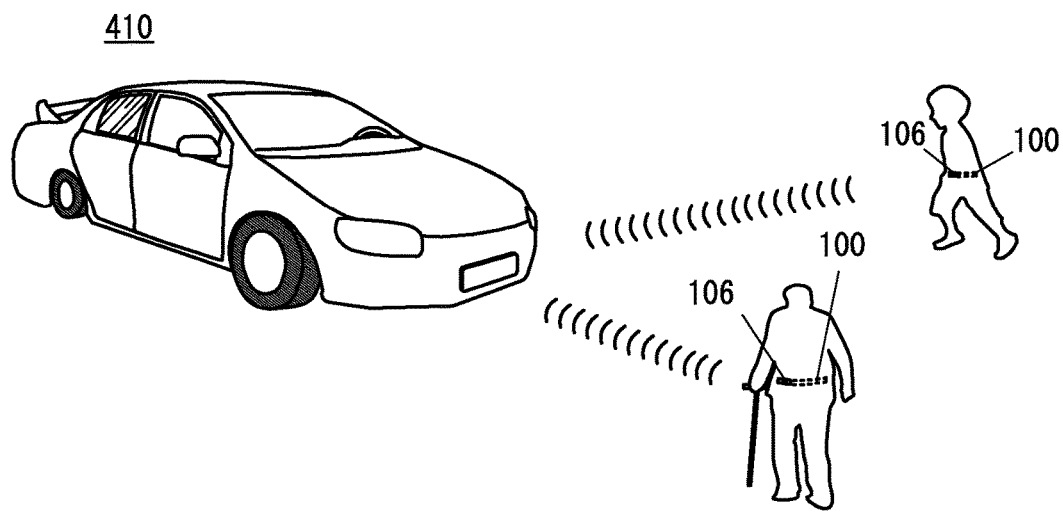

As illustrated in FIG. 4B, the secondary battery module 100 may be equipped with a wireless communication module 106. The wireless communication module 106 enables the secondary battery module 100 to communicate, using dedicated short range communications (DSRC), for example, with a vehicle 410 equipped with a DSRC on-vehicle device, which travels around. When positional information can be exchanged between the vehicle 410 and the secondary battery module 100 equipped with the wireless communication module 106, for example, an alarm can warn the wearer of the secondary battery module 100 and the driver of the vehicle 410 that they may collide with each other. In this manner, a pedestrian-vehicle traffic accident caused by the delay of noticing a pedestrian or the like can be prevented.

As the wireless communication module 106, a GPS receiver may be used. The use of a GPS receiver can inform the wearer of the secondary battery module 100, his/her family, and the like of the location of the wearer.

Although the secondary battery module 100 is worn around the waist in FIGS. 1A to 1E, FIGS. 2A to 2D, FIG. 3, and FIGS. 4A and 4B, one embodiment of the present invention is not limited thereto. For example, as illustrated in FIG. 5A, the secondary battery module 100 may be worn on the head or the neck, in which case the secondary battery module 100 does not necessarily have the same shape as that worn around the waist and ends thereof may be connected like a ring by a connection portion 109, for example.

Alternatively, as in FIG. 5B, the secondary battery module 100 may be attached to a hat. In this case, the secondary battery module 100 may be shaped like a ring in advance without a connection portion.

Alternatively, the secondary battery module 100 may be worn by animals such as dogs and cats. For example, as illustrated in FIG. 5C1, the secondary battery module 100 may be applied to a dog collar and a leash including the secondary battery module 100 may be provided. Alternatively, as in FIG. 5C2, the secondary battery module 100 may be applied to a cat collar.

Alternatively, the secondary battery module 100 may be applied to toys.

Embodiment 3

In this embodiment, a specific structure and material of the secondary battery 102 which can be included in the secondary battery module 100 according to one embodiment of the present invention are described using FIG. 6, FIGS. 7A and 7B, and FIGS. 8A and 8B. In this embodiment, an example where one of a positive electrode and a negative electrode is covered with a bag-like separator will be described below.

Figure 6:
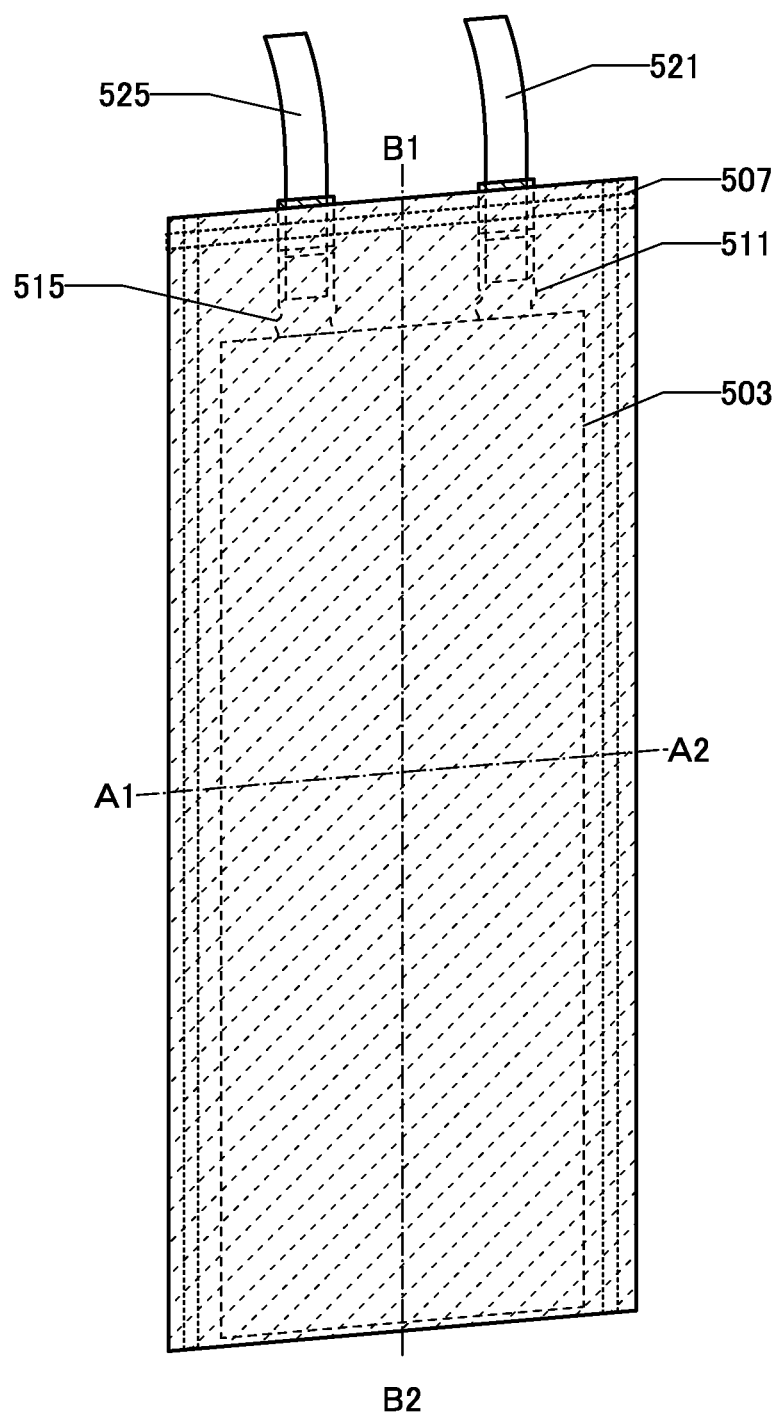
FIG. 6 illustrates a structure of a secondary battery.
Figure 7A:
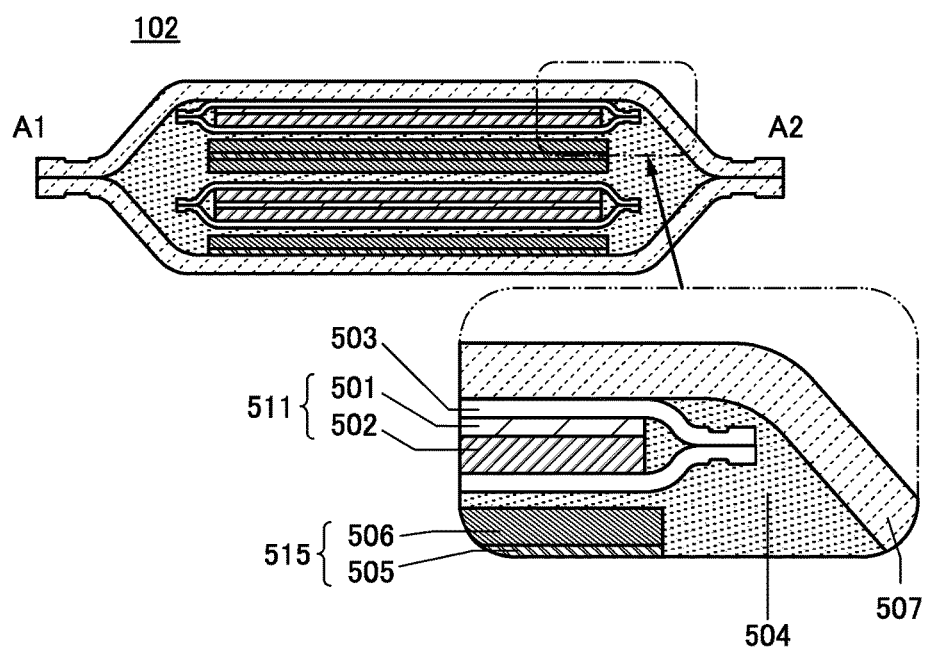
FIGS. 7A and 7B each illustrate a structure of a secondary battery.
Figure 7B:
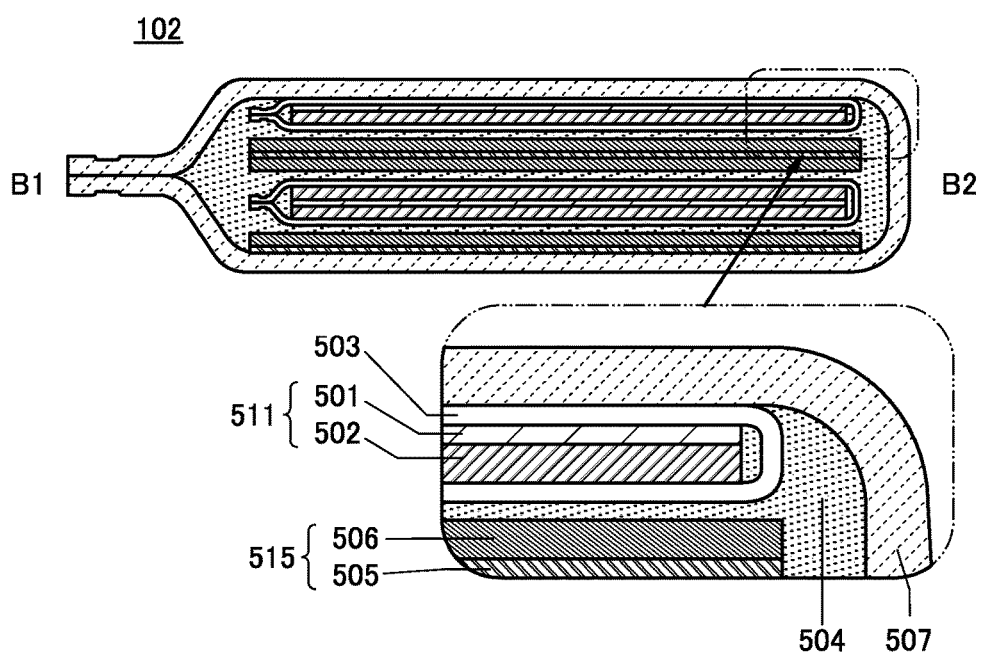

FIG. 6 is a perspective view showing an appearance of the secondary battery 102. FIG. 7A is a cross-sectional view taken along the dash-dot line A1-A2 in FIG. 6. FIG. 7B is a cross-sectional view of a portion indicated by the dash-dot line B1-B2 in FIG. 6.

The secondary battery 102 of one embodiment of the present invention includes a positive electrode 511 covered with the separator 503, a negative electrode 515, and an electrolyte solution 504 in an exterior body 507. In the example in FIG. 6 and FIGS. 7A and 7B, the secondary battery includes one positive electrode including a positive electrode active material layer 502 on one side of a positive electrode current collector 501, one positive electrode including the positive electrode active material layer 502 on each side of the positive electrode current collector 501, one negative electrode including a negative electrode active material layer 506 on one side of a negative electrode current collector 505, and one negative electrode including the negative electrode active material layer 506 on each side of the negative electrode current collector 505. The positive electrode 511 is electrically connected to a positive electrode lead 521. The negative electrode 515 is electrically connected to a negative electrode lead 525. Each of the positive electrode lead 521 and the negative electrode lead 525 is also referred to as a lead electrode or a lead terminal. Parts of the positive electrode lead 521 and the negative electrode lead 525 are positioned outside the exterior body. The secondary battery 102 is charged and discharged through the positive electrode lead 521 and the negative electrode lead 525.

Although FIGS. 7A and 7B illustrate the example in which the positive electrode 511 is covered with the separator 503, one embodiment of the present invention is not limited thereto. For example, the positive electrode 511 is not necessarily covered with the separator 503; instead of the positive electrode 511, the negative electrode 515 may be covered with the separator 503.

Figure 8A:
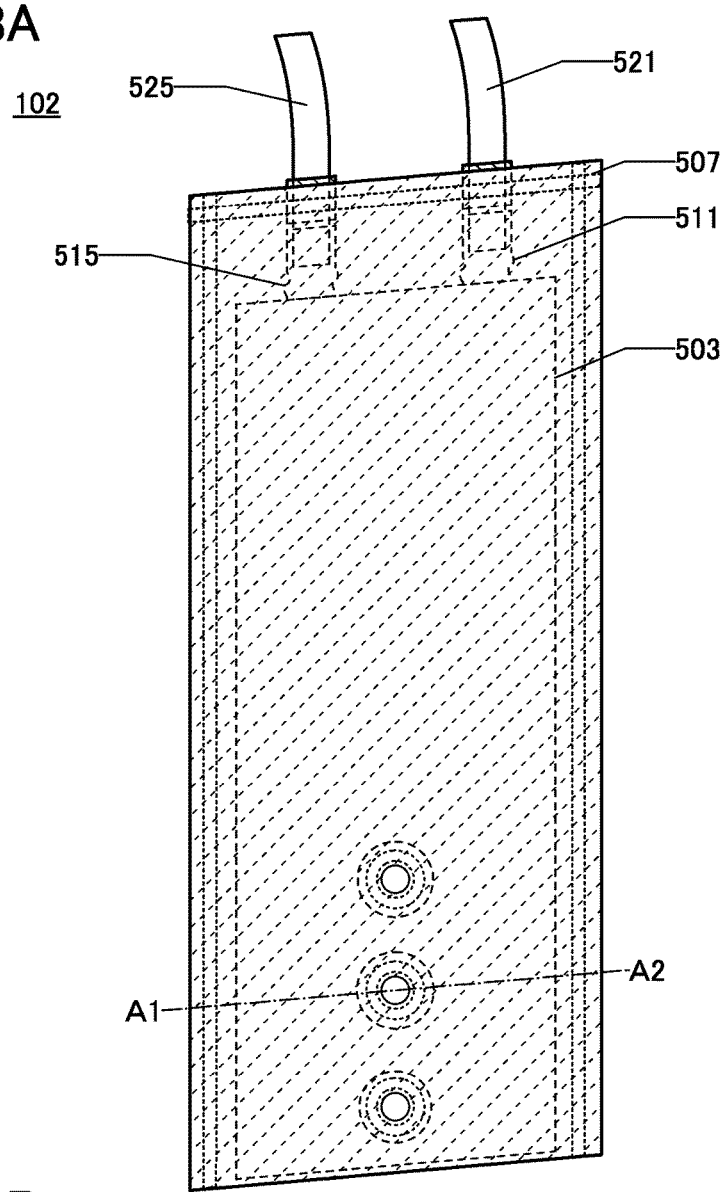
FIGS. 8A and 8B illustrate a structure of a secondary battery.
Figure 8B:
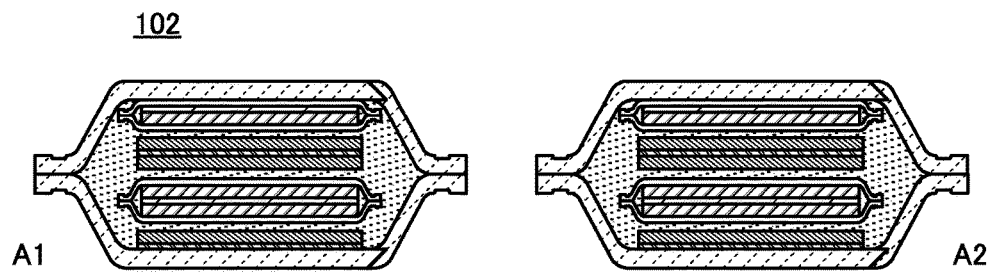

As illustrated in FIGS. 8A and 8B, the secondary battery 102 may have a hole. FIG. 8A is a perspective view illustrating the appearance of the secondary battery 102, and FIG. 8B is a cross-sectional view taken along the dash-dot line A1-A2 in FIG. 8A. The secondary battery 102 with a hole enables effective use of a portion with a hole of the belt portion 101 when used in the secondary battery module 100 having a belt shape.

1. Positive Electrode

The positive electrode 511 includes, for example, the positive electrode current collector 501 and the positive electrode active material layer 502 formed over the positive electrode current collector 501. Although FIGS. 7A and 7B illustrate the example of one positive electrode 511 including the positive electrode active material layer 502 on only one side of the positive electrode current collector 501 with a sheet shape (or a strip-like shape) and one positive electrode 511 including the positive electrode active material layer 502 on each side of the positive electrode current collector 501, one embodiment of the present invention is not limited thereto. Only the positive electrodes 511 each including the positive electrode active material layer 502 on only one side of the positive electrode current collector 501 may be used. In addition, the secondary battery 102 may include three or more positive electrodes 511. An increase in the number of the positive electrodes 511 in the secondary battery 102 can increase the capacity of the secondary battery 102.

The positive electrode current collector 501 can be formed using a material that has high conductivity and does not cause a significant chemical change, such as a metal typified by stainless steel, gold, platinum, aluminum, or titanium, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 501 can have a foil-like shape, a plate-like shape (a sheet-like shape), a net-like shape, a punching-metal shape, an expanded-metal shape, or the like as appropriate. The positive electrode current collector 501 preferably has a thickness of greater than or equal to 5 μm and less than or equal to 30 μm. The surface of the positive electrode current collector 501 may be provided with an undercoat using graphite or the like.

The positive electrode active material layer 502 may further include, in addition to a positive electrode active material, a binder for increasing adhesion of the positive electrode active material, a conductive additive for increasing the conductivity of the positive electrode active material layer 502, and the like.

Examples of the positive electrode active material that can be used for the positive electrode active material layer 502 include a composite oxide with an olivine structure, a composite oxide with a layered rock-salt structure, and a composite oxide with a spinel structure. For example, a compound such as $LiFeO_2$, $LiCoO_2$, $LiNiO_2$, $LiMn_2O_4$, $V_2O_5$, $Cr_2O_5$, or $MnO_2$ can be used.

In particular, $LiCoO_2$ is preferable because it has high capacity and higher stability in the air and higher thermal stability than $LiNiO_2$, for example.

It is preferable to add a small amount of lithium nickel oxide ($LiNiO_2$ or (M=Co, Al, or the like)) to a lithium-containing material with a spinel crystal structure which contains manganese such as $LiMn_2O_4$ because characteristics of the secondary battery using such a material can be improved.

Alternatively, a complex material ($LiMPO_4$ (general formula) (M is one or more of Fe(II), Mn(II), Co(II), and Ni(II))) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

In particular, $LiFePO_4$ is preferable because it meets requirements with balance for the positive electrode active material, such as safety, stability, high capacity density, high potential, and the existence of lithium ions that can be extracted in initial oxidation (charging). Because of the high safety, the use of $LiFePO_4$ in the secondary battery 102 of the secondary battery module 100 which is directly worn is particularly preferable.

Alternatively, a complex material such as $Li_{(2-j)}MSiO_4$ (general formula) (M is one or more of Fe(II), Mn(II), Co(II), and Ni(II); 0≤j≤2) can be used. Typical examples of the general formula $Li_{(2-j)}MSiO_4$ which can be used as a material are lithium compounds such as $Li_{(2-j)}FeSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a nasicon compound expressed by $A_xM_2(XO_4)_3$ (general formula) (A=Li, Na, or Mg, M=Fe, Mn, Ti, V, or Nb, X=S, P, Mo, W, As, or Si) can be used for the positive electrode active material. Examples of the nasicon compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaFeF_3$ and $FeF_3$, a metal chalcogenide (a sulfide, a selenide, or a telluride) such as $TiS_2$ and $MoS_2$, an oxide with an inverse spinel structure such as $LiMVO_4$, a vanadium oxide ($V_2O_5$, $V_6O_{13}$, $LiV_3O_8$, or the like), a manganese oxide, an organic sulfur compound, or the like can be used as the positive electrode active material.

In the case where carrier ions are alkali metal ions other than lithium ions, or alkaline-earth metal ions, a material containing an alkali metal (e.g., sodium or potassium) or an alkaline-earth metal (e.g., calcium, strontium, barium, beryllium, or magnesium) instead of lithium may be used as the positive electrode active material. For example, the positive electrode active material may be a layered oxide containing sodium such as $NaFeO_2$ or $Na_{2/3}[Fe_{1/2}Mn_{1/2}]O_2$.

Further alternatively, any of the aforementioned materials may be combined to be used as the positive electrode active material. For example, a solid solution obtained by combining two or more of the above materials can be used as the positive electrode active material. For example, a solid solution of $LiCo_{1/3}Mn_{1/3}Ni_{1/3}O_2$ and $Li_2MnO_3$ can be used as the positive electrode active material.

Note that although not shown, a conductive material such as a carbon layer may be provided on a surface of the positive electrode active material layer 502. With the conductive material such as the carbon layer, conductivity of the electrode can be increased. For example, the positive electrode active material layer 502 can be coated with the carbon layer by mixing a carbohydrate such as glucose at the time of baking the positive electrode active material.

The average particle diameter of the primary particle of the positive electrode active material layer 502 is preferably greater than or equal to 50 nm and less than or equal to 100 μm.

Examples of the conductive additive include acetylene black (AB), graphite (black lead) particles, carbon nanotubes, graphene, and fullerene.

A network for electron conduction can be formed in the positive electrode 511 by the conductive additive. The conductive additive also allows maintaining of a path for electric conduction between the particles of the positive electrode active material layer 502. The addition of the conductive additive to the positive electrode active material layer 502 increases the electron conductivity of the positive electrode active material layer 502.

As the binder, instead of polyvinylidene fluoride (PVDF) as a typical one, polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, nitrocellulose or the like can be used.

The content of the binder in the positive electrode active material layer 502 is preferably greater than or equal to 1 wt % and less than or equal to 10 wt %, more preferably greater than or equal to 2 wt % and less than or equal to 8 wt %, and still more preferably greater than or equal to 3 wt % and less than or equal to 5 wt %. The content of the conductive additive in the positive electrode active material layer 502 is preferably greater than or equal to 1 wt % and less than or equal to 10 wt %, more preferably greater than or equal to 1 wt % and less than or equal to 5 wt %.

In the case where the positive electrode active material layer 502 is formed by a coating method, the positive electrode active material, the binder, and the conductive additive are mixed to form a positive electrode paste (slurry), and the positive electrode paste is applied to the positive electrode current collector 501 and dried.

2. Negative Electrode

The negative electrode 515 includes, for example, the negative electrode current collector 505 and the negative electrode active material layer 506 formed over the negative electrode current collector 505. Although FIGS. 7A and 7B illustrate the example of one negative electrode 515 including the negative electrode active material layer 506 on only one side of the negative electrode current collector 505 with a sheet shape (or a strip-like shape) and one negative electrode 515 including the negative electrode active material layer 506 on each side of the negative electrode current collector 505, one embodiment of the present invention is not limited thereto. Only the negative electrodes 515 each including the negative electrode active material layer 506 on only one side of the negative electrode current collector 505 may be used. In this case, the two overlapping negative electrodes 515 are preferably arranged such that the sides of the negative electrode current collectors 505, each of which is not provided with the negative electrode active material layer 506, are in contact with each other because such arrangement can make friction between the contacting sides low to easily relieve stress generated when the secondary battery 102 is curved. Only the negative electrodes 515 each including the negative electrode active material layer 506 on each side of the negative electrode current collector 505 may be used. In addition, the secondary battery 102 may include three or more negative electrodes 515. An increase in the number of the negative electrodes 515 in the secondary battery 102 can increase the capacity of the secondary battery 102.

The negative electrode current collector 505 can be formed using a material that has high conductivity and is not alloyed with a carrier ion of lithium or the like, such as stainless steel, gold, platinum, iron, copper, titanium, or an alloy thereof. Alternatively, an aluminum alloy to which an element which improves heat resistance, such as silicon, titanium, neodymium, scandium, or molybdenum, is added can be used. The negative electrode current collector 505 can have a foil-like shape, a plate-like shape (a sheet-like shape), a net-like shape, a punching-metal shape, an expanded-metal shape, or the like as appropriate. The negative electrode current collector 505 preferably has a thickness greater than or equal to 5 μm and less than or equal to 30 μm. The surface of the negative electrode current collector 505 may be provided with an undercoat using graphite or the like.

The negative electrode active material layer 506 may further include, in addition to a negative electrode active material, a binder for increasing adhesion of the negative electrode active material, a conductive additive for increasing the conductivity of the negative electrode active material layer 506, and the like.

There is no particular limitation on the negative electrode active material as long as it is a material with which lithium can be dissolved and precipitated or a material into/from which lithium ions can be inserted and extracted. Other than a lithium metal or lithium titanate, a carbon-based material generally used in the field of power storage, or an alloy-based material can also be used as the negative electrode active material layer 506.

The lithium metal is preferable because of its low redox potential (−3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a low potential substantially equal to that of a lithium metal (0.1 V to 0.3 V vs. Li/Li$^+$) when lithium ions are inserted into the graphite (when a lithium-graphite intercalation compound is formed). For this reason, a lithium ion battery can have a high operating voltage. In addition, graphite is preferable because of its advantages such as relatively high capacity per unit volume, small volume expansion, low cost, and safety greater than that of a lithium metal.

For the negative electrode active material, an alloy-based material or oxide which enables charge-discharge reaction by an alloying reaction and a dealloying reaction with lithium can be used. In the case where lithium ions are carrier ions, the alloy-based material is, for example, a material containing at least one of Mg, Ca, Al, Si, Ge, Sn, Pb, Sb, Bi, Ag, Au, Zn, Cd, Hg, In, and the like. Such elements have higher capacity than carbon. In particular, silicon has a significantly high theoretical capacity of 4200 mAh/g. For this reason, silicon is preferably used as the negative electrode active material. Examples of the alloy-based material using such elements include $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like.

Alternatively, for the negative electrode active material, an oxide such as SiO, SnO, $SnO_2$, titanium oxide ($TiO_2$), lithium titanium oxide ($Li_4Ti_5O_{12}$), lithium-graphite intercalation compound ($Li_xC_6$), niobium oxide ($Nb_2O_5$), tungsten oxide ($WO_2$), or molybdenum oxide ($MoO_2$) can be used.

Still alternatively, as the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. Note that in the case of using a material containing lithium ions as a positive electrode active material, the nitride containing lithium and a transition metal can be used as the negative electrode active material by extracting the lithium ions contained in the positive electrode active material in advance.

Alternatively, a material which causes a conversion reaction can be used as the negative electrode active material. For example, a transition metal oxide with which an alloying reaction with lithium is not caused, such as cobalt oxide (CoO), nickel oxide (NiO), or iron oxide (FeO), may be used for the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high electrode potential.

In the case where the negative electrode active material layer 506 is formed by a coating method, the negative electrode active material and the binder are mixed to form a negative electrode paste (slurry), and the negative electrode paste is applied to the negative electrode current collector 505 and dried. Note that a conductive additive may be added to the negative electrode paste.

Graphene may be formed on a surface of the negative electrode active material layer 506. In the case of using silicon as the negative electrode active material, the volume of silicon is greatly changed due to occlusion and release of carrier ions in charge-discharge cycles. Therefore, adhesion between the negative electrode current collector 505 and the negative electrode active material layer 506 is decreased, resulting in degradation of battery characteristics caused by charge and discharge. Thus, graphene is preferably formed on a surface of the negative electrode active material layer 506 containing silicon because even when the volume of silicon is changed in charge-discharge cycles, decrease in the adhesion between the negative electrode current collector 505 and the negative electrode active material layer 506 can be inhibited, which makes it possible to reduce degradation of battery characteristics.

Alternatively, a coating film of an oxide or the like may be formed on the surface of the negative electrode active material layer 506. A coating film formed by decomposition or the like of an electrolyte solution or the like in charging cannot release electric charges used at the formation, and therefore forms irreversible capacity. In contrast, the film of an oxide or the like provided on the surface of the negative electrode active material layer 506 in advance can reduce or prevent generation of irreversible capacity.

As the coating film coating the negative electrode active material layer 506, an oxide film of any one of niobium, titanium, vanadium, tantalum, tungsten, zirconium, molybdenum, hafnium, chromium, aluminum, and silicon or an oxide film containing any one of these elements and lithium can be used. Such a film is denser than a conventional film formed on a surface of a negative electrode due to a decomposition product of an electrolyte solution.

For example, niobium oxide ($Nb_2O_5$) has a low electric conductivity of $10^{-9}$ S/cm and a high insulating property. For this reason, a niobium oxide film inhibits electrochemical decomposition reaction between the negative electrode active material and the electrolyte solution. On the other hand, niobium oxide has a lithium diffusion coefficient of $10^{-9}$ cm$^2$/sec and high lithium ion conductivity. Therefore, niobium oxide can transmit lithium ions. Alternatively, silicon oxide or aluminum oxide may be used.

A sol-gel method can be used to coat the negative electrode active material layer 506 with the coating film, for example. The sol-gel method is a method for forming a thin film in such a manner that a solution of metal alkoxide, a metal salt, or the like is changed into a gel, which has lost its fluidity, by hydrolysis reaction and polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. In such a manner, the coating film can be formed on the surface of the negative electrode active material layer 506. A decrease in the capacity of the power storage unit can be prevented by using the coating film.

3. Separator

As a material of the separator 503, a porous insulator such as cellulose, polypropylene (PP), polyethylene (PE), polybutene, nylon, polyester, polysulfone, polyacrylonitrile, polyvinylidene fluoride, or tetrafluoroethylene can be used. Alternatively, nonwoven fabric of a glass fiber or the like, or a diaphragm in which a glass fiber and a polymer fiber are mixed may be used.

4. Electrolyte Solution

As an electrolyte in the electrolyte solution 504, a material having carrier ion mobility and containing lithium ions serving as carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, $Li(C_2F_5SO_2)_2N$, and $Li(SO_2F)_2N$. One of these electrolytes may be used alone, or two or more of them may be used in an appropriate combination and in an appropriate ratio.

As a solvent of the electrolyte solution 504, a material with the carrier ion mobility is used. As the solvent of the electrolyte solution, an aprotic organic solvent is preferably used. Typical examples of aprotic organic solvents include ethylene carbonate (EC), propylene carbonate, dimethyl carbonate, diethyl carbonate (DEC), ethylmethyl carbonate (EMC), γ-butyrolactone, acetonitrile, dimethoxyethane, tetrahydrofuran, and the like, and one or more of these materials can be used. When a gelled high-molecular material is used as the solvent of the electrolytic solution or a high-molecular material for gelling is added to the electrolytic solution, for example, safety against liquid leakage and the like is improved. Furthermore, the storage battery can be thinner and more lightweight. Typical examples of gelled high-molecular materials include a silicone gel, an acrylic gel, an acrylonitrile gel, a polyethylene oxide-based gel, a polypropylene oxide-based gel, a gel of a fluorine-based polymer, and the like. Alternatively, the use of one or more kinds of ionic liquids (room temperature molten salts) which have features of non-flammability and non-volatility as a solvent of the electrolyte solution can prevent the storage battery from exploding or catching fire even when the storage battery internally shorts out or the internal temperature increases owing to overcharging or the like. An ionic liquid is a salt in the fluid state and has high ion mobility (conductivity). An ionic liquid contains a cation and an anion. Examples of ionic liquids include an ionic liquid containing an ethylmethylimidazolium (EMI) cation and an ionic liquid containing an N-methyl-N-propylpiperidinium ($PP_{13}$) cation.

5. Exterior Body

There are a variety of structures of a secondary battery, and a film is used for formation of the exterior body 507 in this embodiment. Note that the film used for the exterior body 507 is a single-layer film selected from a metal film (e.g., an aluminum film, a stainless steel film, and a nickel steel film), a plastic film made of an organic material, a hybrid material film including an organic material (e.g., an organic resin or fiber) and an inorganic material (e.g., ceramic), and a carbon-containing inorganic film (e.g., a carbon film or a graphite film); or a stacked-layer film including two or more of the above films. Forming a depression or a projection on a surface of a metal film by embossing increases the surface area of the exterior body 507 exposed to outside air, achieving efficient heat dissipations.

In the case where the secondary battery 102 is changed in form by externally applying force, bending stress is externally applied to the exterior body 507 of the secondary battery 102. This might partly deform or damage the exterior body 507. Projections or depressions formed on the exterior body 507 can relieve a strain caused by stress applied to the exterior body 507. Therefore, the secondary battery 102 can have high reliability. Note that a "strain" is the scale of change in form indicating the displacement of a point of an object relative to the reference (initial) length of the object. The exterior body 507 having depressions or projections can reduce the influence of a strain caused by application of external force to the power storage unit to an acceptable level. Thus, the power storage unit having high reliability can be provided.

This embodiment can be implemented in appropriate combination with any of the other embodiments.

Embodiment 4

In this embodiment, an example of a method of manufacturing the secondary battery 102, which has the shape illustrated in FIG. 6 and FIGS. 7A and 7B and can be included in the secondary battery module 100 according to one embodiment of the present invention, is described using FIGS. 9A to 9C, FIGS. 10A and 10B, and FIGS. 11A and 11B.

1. Preparing Positive Electrode and Covering it with Separator

Figure 9A:
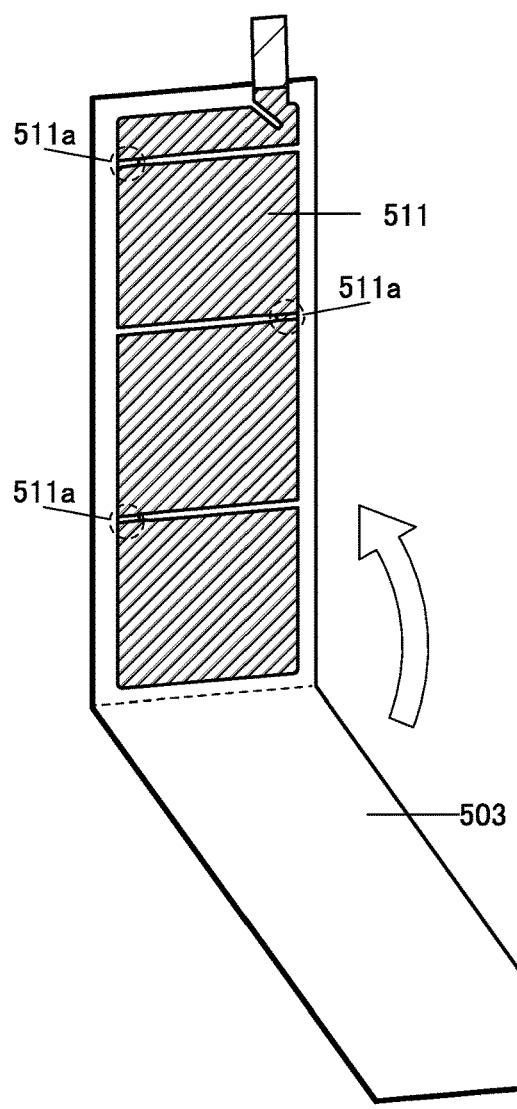
FIGS. 9A to 9C illustrate a method of manufacturing a secondary battery.

First, the positive electrode 511 including the positive electrode active material layer 502 is placed on the separator 503 (see FIG. 9A). FIG. 9A illustrates an example where the positive electrode active material layer 502 is provided on each side of the positive electrode current collector 501 having a meandering shape in which a slit is formed.

The slit formed in the positive electrode current collectors 501 can suppress the difference between the positions of end portions of the plurality of positive electrode current collectors 501 when the secondary battery 102 is curved. The slit can also relieve tension applied to the current collector far from the curvature center.

Furthermore, there is no positive electrode active material layer 502 in a region 511a, which overlaps with a later-described slit of the negative electrode 515 when the positive electrode 511 and the negative electrode 515 are stacked in a later step. If the positive electrode active material layer 502 is present in the region 511a, where the positive electrode 511 overlaps with the slit of the negative electrode 515, there is no negative electrode active material layer 506 in a region overlapping with this positive electrode active material layer 502, which might cause a problem in a battery reaction. Specifically, this might concentrate carrier ions released from the positive electrode active material layer 502 in the negative electrode active material layer 506 in the region closest to the slit, so that the metal might be deposited on the negative electrode active material layer 506. Thus, the deposition of the metal on the negative electrode active material layer 506 can be suppressed when there is no positive electrode active material layer 502 in the region 511a overlapping with the slit of the negative electrode 515.

Then, the separator 503 is folded along the dotted line in FIG. 9A so that the positive electrode 511 is interposed between facing parts of the separator 503. Next, the outer edges of the separator 503, which is outside of the positive electrode 511, are bonded to form the bag-like separator 503 (see FIG. 9B). The bonding of the outer edges of the separator 503 can be performed with the use of an adhesive or the like, by ultrasonic welding, or by thermal fusion bonding.

Figure 9B:
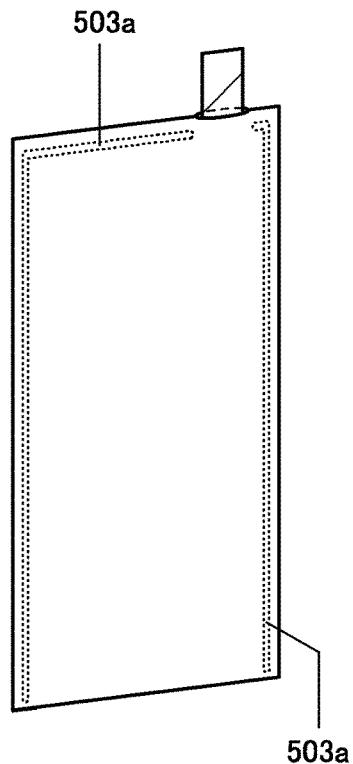

In this embodiment, polypropylene is used as the separator 503, and the outer edges of the separator 503 are bonded to each other by heating. Bonding portions 503a are illustrated in FIG. 9B. In such a manner, the positive electrode 511 can be covered with the separator 503. The separator 503 is formed so as to cover the positive electrode active material layer 502 and does not necessarily cover the whole positive electrode 511.

Figure 9C:
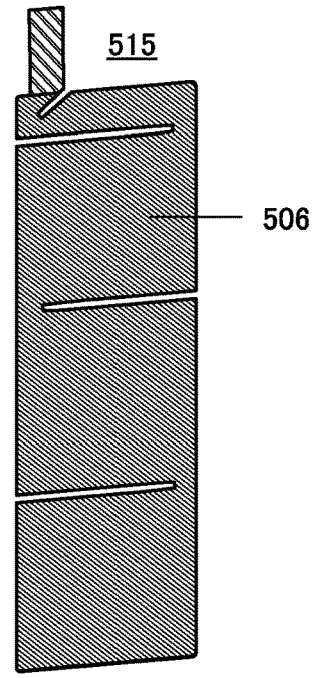

Although the separator 503 is folded in FIGS. 9A to 9C, one embodiment of the present invention is not limited thereto. For example, the positive electrode 511 may be interposed between two separators. In that case, the bonding portion 503a may be formed to surround almost all of the four sides of the positive electrode 511.

The outer edges of the separator 503 may be bonded, using the dashed line-like or dot-like bonding portions provided at regular intervals.

Alternatively, bonding may be performed along only one side of the outer edges. Alternatively, bonding may be performed along only two sides of the outer edges. Alternatively, bonding may be performed along four sides of the outer edges. Accordingly, the four sides can be in an even state.

Although the case where the positive electrode 511 is covered with the separator 503 is shown in FIGS. 9A to 9C and the like, one embodiment of the present invention is not limited thereto. For example, the positive electrode 511 is not necessarily covered with the separator 503; instead of the positive electrode 511, the negative electrode 515 may be covered with the separator 503.

2. Preparing Negative Electrode

Next, the negative electrode 515 is prepared (see FIG. 9C). FIG. 9C illustrates an example where the negative electrode active material layer 506 is provided on each side of the negative electrode current collector 505 having a meandering shape in which a slit is formed.

The slit formed in the negative electrode current collectors 505 can suppress the difference between the positions of end portions of the plurality of current collectors when the secondary battery 102 is curved. The slit can also relieve tension applied to the current collector far from the curvature center.

3. Making Positive Electrodes and Negative Electrodes Overlap with Each Other and Connecting Leads Next, the positive electrodes 511 and the negative electrodes 515 are stacked (see FIG. 10A). This embodiment shows an example in which two positive electrodes 511 and two negative electrodes 515 are used.

Next, the positive electrode lead 521 including a sealing layer 520 is electrically connected to positive electrode tabs of the plurality of positive electrode current collectors 501 by ultrasonic wave irradiation with pressure applied (ultrasonic welding).

The lead electrode is likely to be cracked or cut by stress due to external force applied after manufacture of the power storage unit.

Figure 10A:
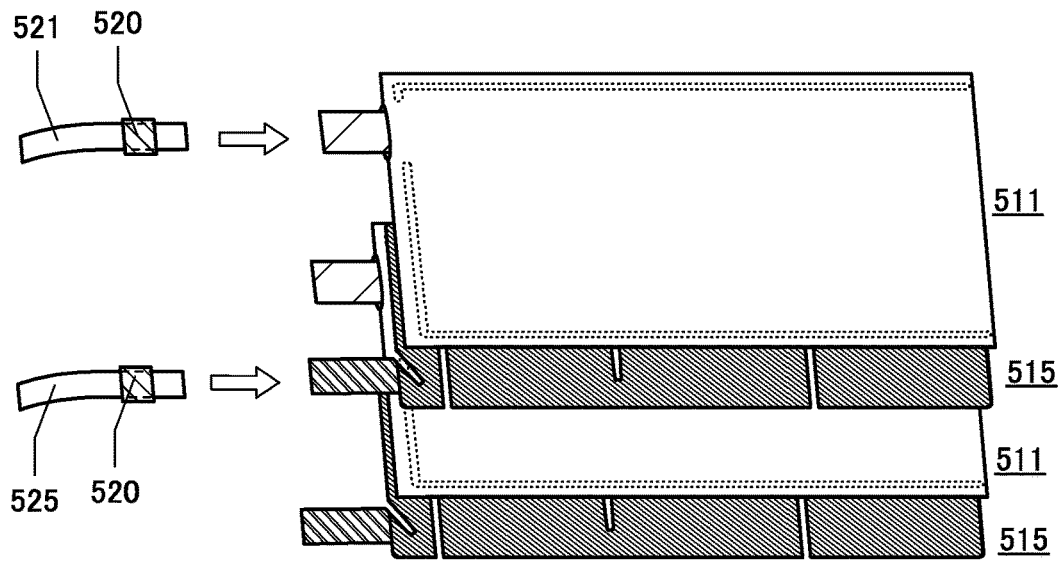
FIGS. 10A and 10B illustrate a method of manufacturing a secondary battery.
Figure 10B:
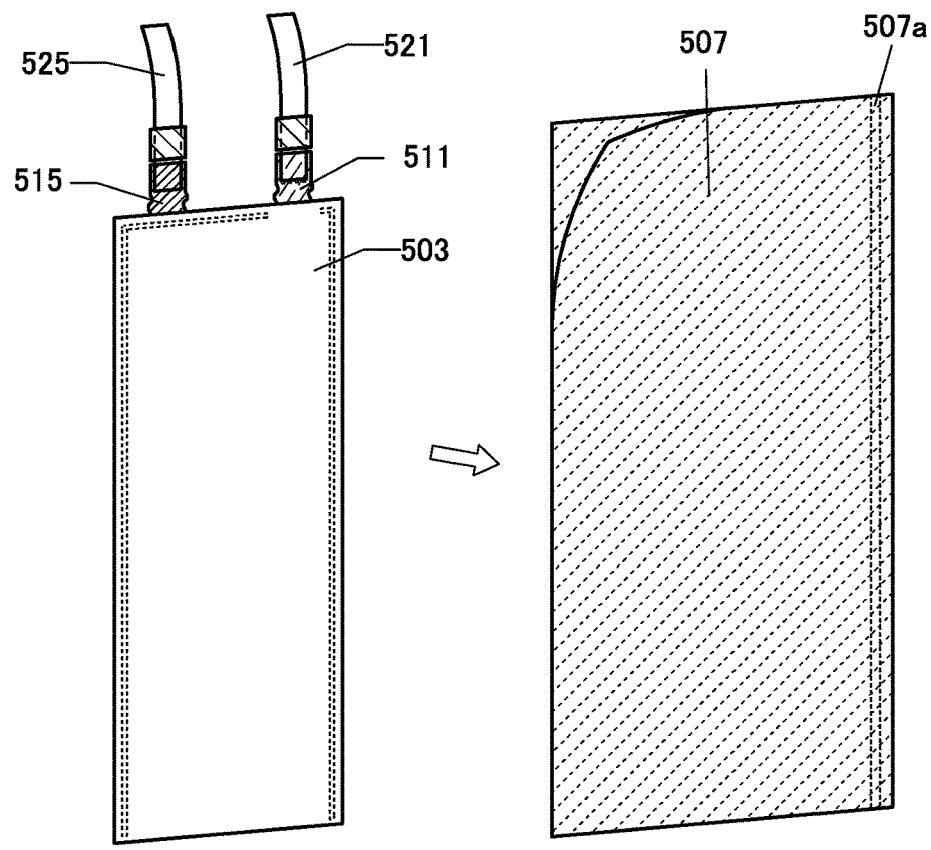

When subjected to ultrasonic welding, the positive electrode lead 521 and the positive electrode current collector 501 are placed between bonding dies provided with projections, whereby a connection region 522 and a bent portion 523 can be formed in the positive electrode tab (FIG. 10B).

This bent portion 523 can relieve stress due to external force applied after fabrication of the secondary battery 102. Accordingly, the reliability of the secondary battery 102 can be increased.

The bent portion 523 is not necessarily formed in the positive electrode tab. The positive electrode current collector may be formed using a high-strength material such as stainless steel to a thickness of 10 µm or less, in order to easily relieve stress due to external force applied after fabrication of a secondary battery.

It is needless to say that two or more of the above examples may be combined to relieve concentration of stress in the positive electrode tab.

Then, in a manner similar to that of the positive electrode current collector 501, the negative electrode lead 525 including the sealing layer 520 is electrically connected to the negative electrode tab of the negative electrode current collector 505 by ultrasonic welding.

4. Preparing Exterior Body and Covering Positive Electrodes and Negative Electrodes Next, a film used as an exterior body is folded, and thermocompression bonding is performed along one side of the folded exterior body. A portion where thermocompression bonding is performed along one side of the folded exterior body 507 is shown as a bonding portion 507a in FIG. 10B. With the exterior body 507 thus obtained, the positive electrodes 511 and the negative electrodes 515 are covered.

5. Injecting Electrolyte Solution

Figure 11A:
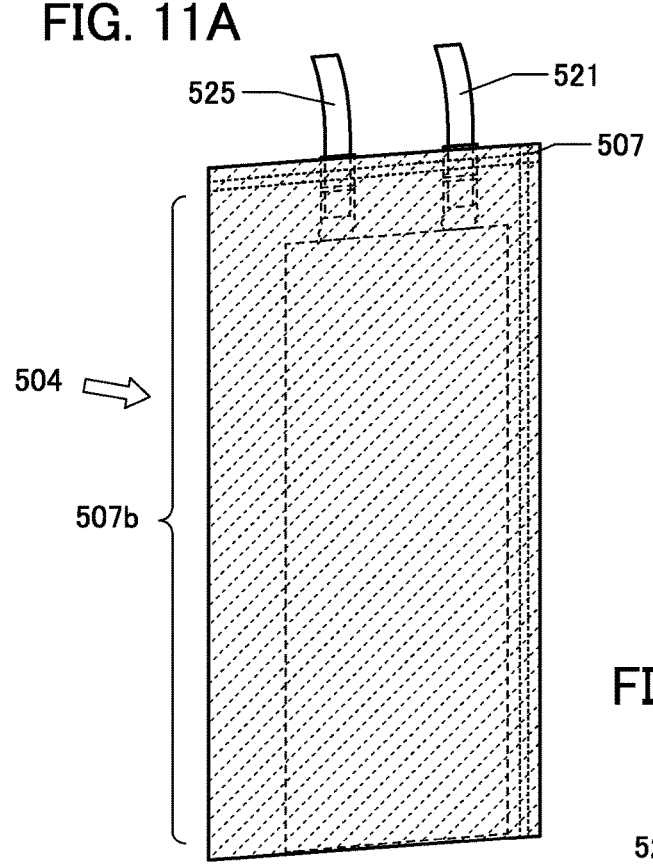
FIGS. 11A and 11B illustrate a method of manufacturing a secondary battery.

Next, thermocompression bonding is also performed along one side of the exterior body 507, which overlaps with the sealing layer 520 provided on the positive electrode lead 521 and the sealing layer 520 provided on the negative electrode lead 525 (FIG. 11A). After that, the electrolyte solution 504 is injected from an unsealed side 507b of the exterior body 507, which is illustrated in FIG. 11A, into a region covered with the exterior body 507.

Figure 11B:
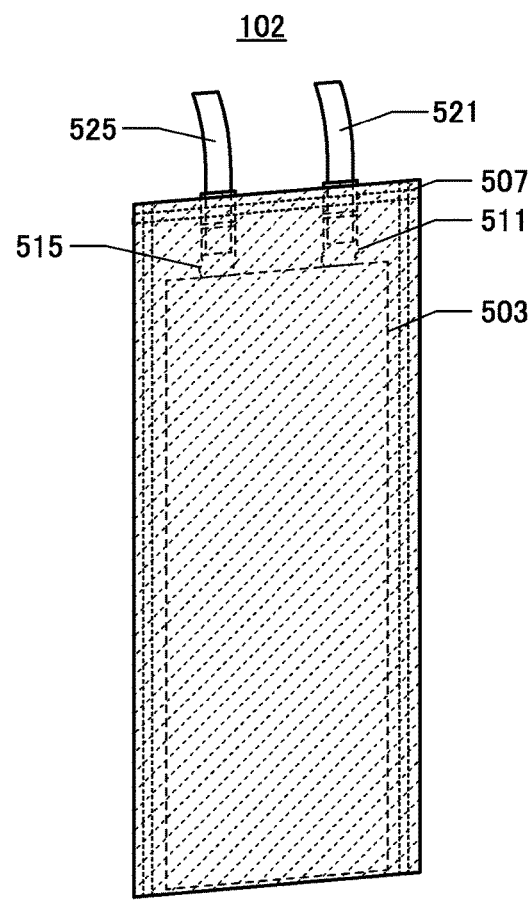

Then, the unsealed side 507b of the exterior body 507 is sealed under vacuum, heat, and pressure. The secondary battery 102 is thus obtained (FIG. 11B). Injecting the electrolyte solution and sealing are performed in an environment from which oxygen is eliminated, for example, in a glove box. The evacuation to a vacuum may be performed with a vacuum sealer, a liquid pouring sealer, or the like. Heating and pressing can be performed with the unsealed side 507b placed between two heatable bars included in the sealer. An example of the conditions is as follows: the degree of vacuum is 60 kPa, the heating temperature is 190° C., the pressure is 0.1 MPa, and the time is 3 seconds. Here, pressure may be applied to a unit through the exterior body 507. The application of pressure enables removal of bubbles which enter between the positive electrode and the negative electrode when the electrolyte solution is injected.

7. Modification Example

Figure 12A:
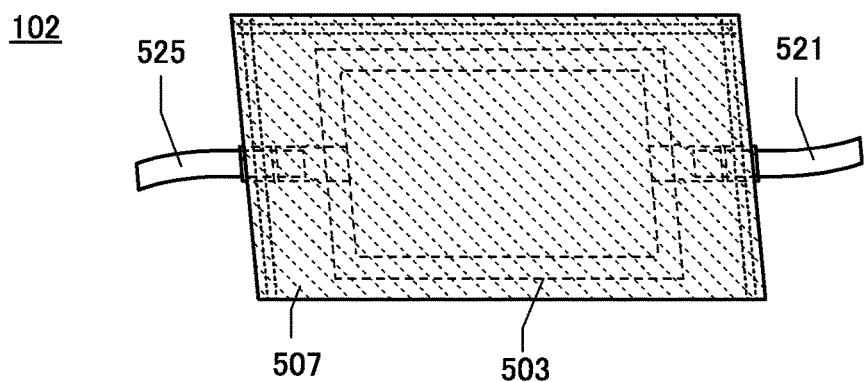
FIG. 12A illustrates a structure of a secondary battery and FIG. 12B illustrates a manufacturing method thereof.
Figure 12B:
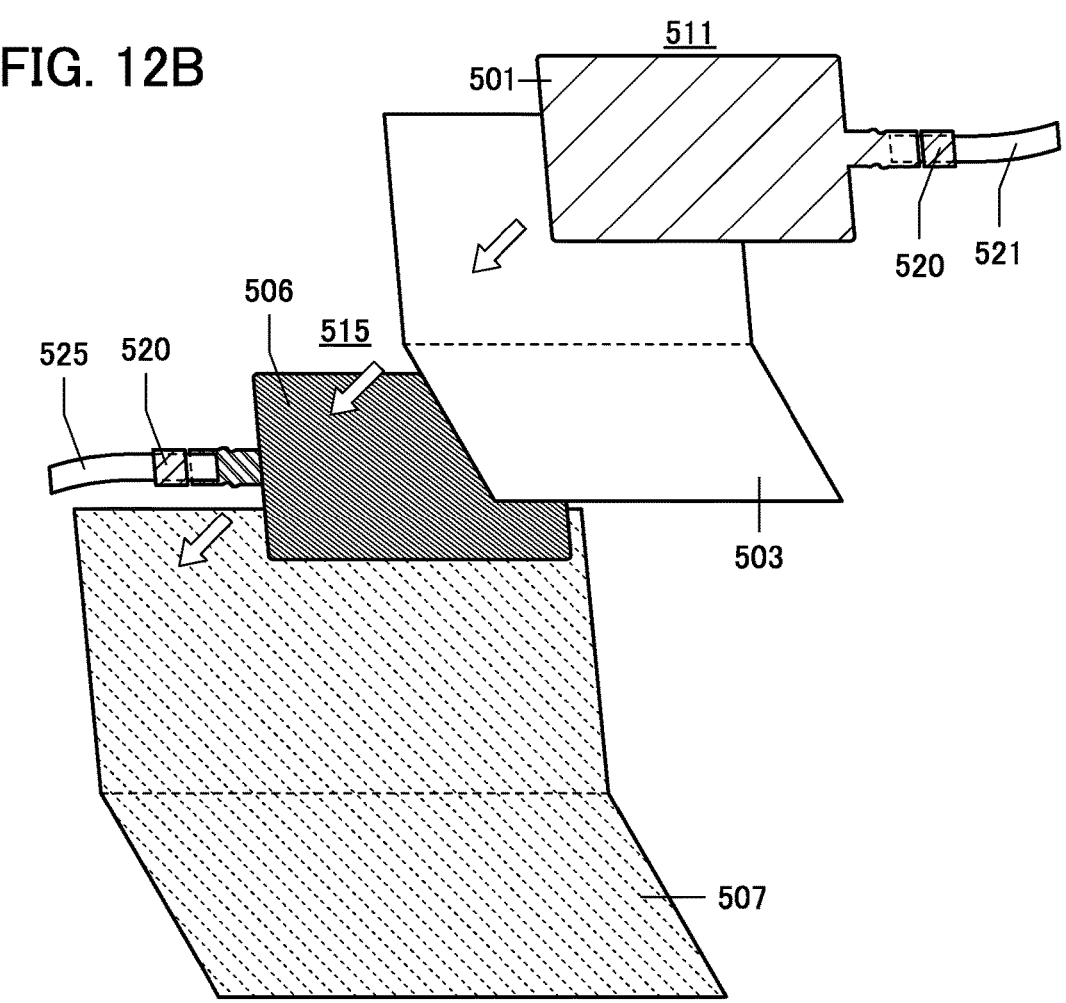

FIG. 12A illustrates a modification example of the secondary battery 102. The secondary battery 102 illustrated in FIG. 12A is different from the secondary battery 102 shown in FIG. 6 in the arrangement of the positive electrode lead 521 and the negative electrode lead 525. Specifically, the positive electrode lead 521 and the negative electrode lead 525 in the secondary battery 102 in FIG. 6 are provided on the same side of the exterior body 507, whereas the positive electrode lead 521 and the negative electrode lead 525 in the secondary battery 102 in FIGS. 12A and 12B are provided on different sides of the exterior body 507. Thus, the lead electrodes of the secondary battery of one embodiment of the present invention can be freely positioned, and accordingly the degree of freedom in design is high. Accordingly, a product including the secondary battery of one embodiment of the present invention can have a high degree of freedom in design. Furthermore, the yield of products each including the secondary battery of one embodiment of the present invention can be increased.

FIG. 12B illustrates a fabrication process of the secondary battery 102 in FIG. 12A. The manufacturing method of the secondary battery 102 in FIG. 6 can be referred to for the details. Note that in FIG. 12B, the electrolyte solution 504 is omitted.

Pressing (e.g., embossing) may be performed to form unevenness in advance on a surface of a film used as the exterior body 507. The unevenness on the surface of the film increases flexibility of a secondary battery and further relieves stress. The depressions or projections of a surface (or a rear surface) of the film formed by embossing form an obstructed space that is sealed by the film serving as a part of a wall of the sealing structure and whose inner volume is variable. It can be said that the depressions or projections of the film form an accordion structure (bellows structure) in this obstructed space. Note that embossing, which is a kind of pressing, is not necessarily employed and any method that allows formation of a relief on part of the film is employed.

This embodiment can be implemented in appropriate combination with any of the other embodiments and example.

This application is based on Japanese Patent Application serial no. 2014-196132 filed with the Japan Patent Office on Sep. 26, 2014, the entire contents of which are hereby incorporated by reference.

What is claimed is:

1. A secondary battery module comprising:
   a flexible secondary battery in a belt portion;
   a power transmitting device configured to transmit and receive power in a non-contact manner in the belt portion; and
   a flexible power generating device in the belt portion,
   wherein the flexible secondary battery and the flexible power generating device overlap each other in the belt portion, and
   wherein the flexible secondary battery and the flexible power generating device are sandwiched between a front surface of the belt portion and a rear surface of the belt portion.

2. The secondary battery module according to claim 1, wherein the flexible power generating device comprises a thermoelectric power generating device.

3. The secondary battery module according to claim 1, wherein the flexible power generating device comprises a solar battery.

4. The secondary battery module according to claim 1, further comprising a display portion which is provided in the belt portion.

5. The secondary battery module according to claim 1, further comprising a display portion which is provided in the belt portion,
wherein the display portion is configured to display a battery level of the flexible secondary battery.

6. The secondary battery module according to claim 1, further comprising a wireless communication module.

7. The secondary battery module according to claim 1, wherein the flexible secondary battery is sandwiched between the power transmitting device and the flexible power generating device in the belt portion.

8. A secondary battery module comprising:
a flexible secondary battery in a belt portion;
a power transmitting device configured to transmit and receive power in a non-contact manner in the belt portion; and
a flexible power generating device in the belt portion,
wherein the flexible secondary battery and the flexible power generating device overlap each other in the belt portion,
wherein the flexible secondary battery and the flexible power generating device are sandwiched between a front surface of the belt portion and a rear surface of the belt portion, and
wherein the flexible secondary battery is configured to be charged with power received by the power transmitting device and power generated by the flexible power generating device.

9. The secondary battery module according to claim 8, wherein the flexible power generating device comprises a thermoelectric power generating device.

10. The secondary battery module according to claim 8, wherein the flexible power generating device comprises a solar battery.

11. The secondary battery module according to claim 8, further comprising a display portion which is provided in the belt portion.

12. The secondary battery module according to claim 8, further comprising a wireless communication module.

13. The secondary battery module according to claim 8, wherein the power transmitting device is configured to transmit power to an electronic device.

14. A power feeding system comprising:
a secondary battery module comprising:
a flexible secondary battery in a belt portion;
a first power transmitting device configured to transmit and receive power in a non-contact manner in the belt portion; and
a flexible power generating device in the belt portion; and
an electronic device comprising:
a second power transmitting device configured to receive power in a non-contact manner,
wherein the flexible secondary battery and the flexible power generating device overlap each other in the belt portion,
wherein the flexible secondary battery and the flexible power generating device are sandwiched between a front surface of the belt portion and a rear surface of the belt portion, and
wherein the first power transmitting device is configured to transmit power to the second power transmitting device.

15. The power feeding system according to claim 14, wherein the electronic device is a glasses-type device or a wristband-type device.

16. The power feeding system according to claim 14, wherein the flexible secondary battery is sandwiched between the first power transmitting device and the flexible power generating device in the belt portion.

17. A secondary battery module comprising:
a secondary battery in a belt portion;
a power transmitting device configured to transmit and receive power in a non-contact manner in the belt portion; and
a flexible power generating device in the belt portion,
wherein the secondary battery and the flexible power generating device overlap each other in the belt portion, and
wherein the secondary battery and the flexible power generating device are sandwiched between a front surface of the belt portion and a rear surface of the belt portion.

18. The secondary battery module according to claim 17, further comprising a display portion which is provided in the belt portion.

19. The secondary battery module according to claim 17, further comprising a wireless communication module.

20. The secondary battery module according to claim 17, wherein the secondary battery is configured to be charged with power received by the power transmitting device and power generated by the flexible power generating device, and
wherein the power transmitting device is configured to transmit power to an electronic device.

* * * * *